Jan. 3, 1939.  T. J. NUNAN  2,142,252
RECORDING DEVICE
Filed March 4, 1937   12 Sheets-Sheet 5

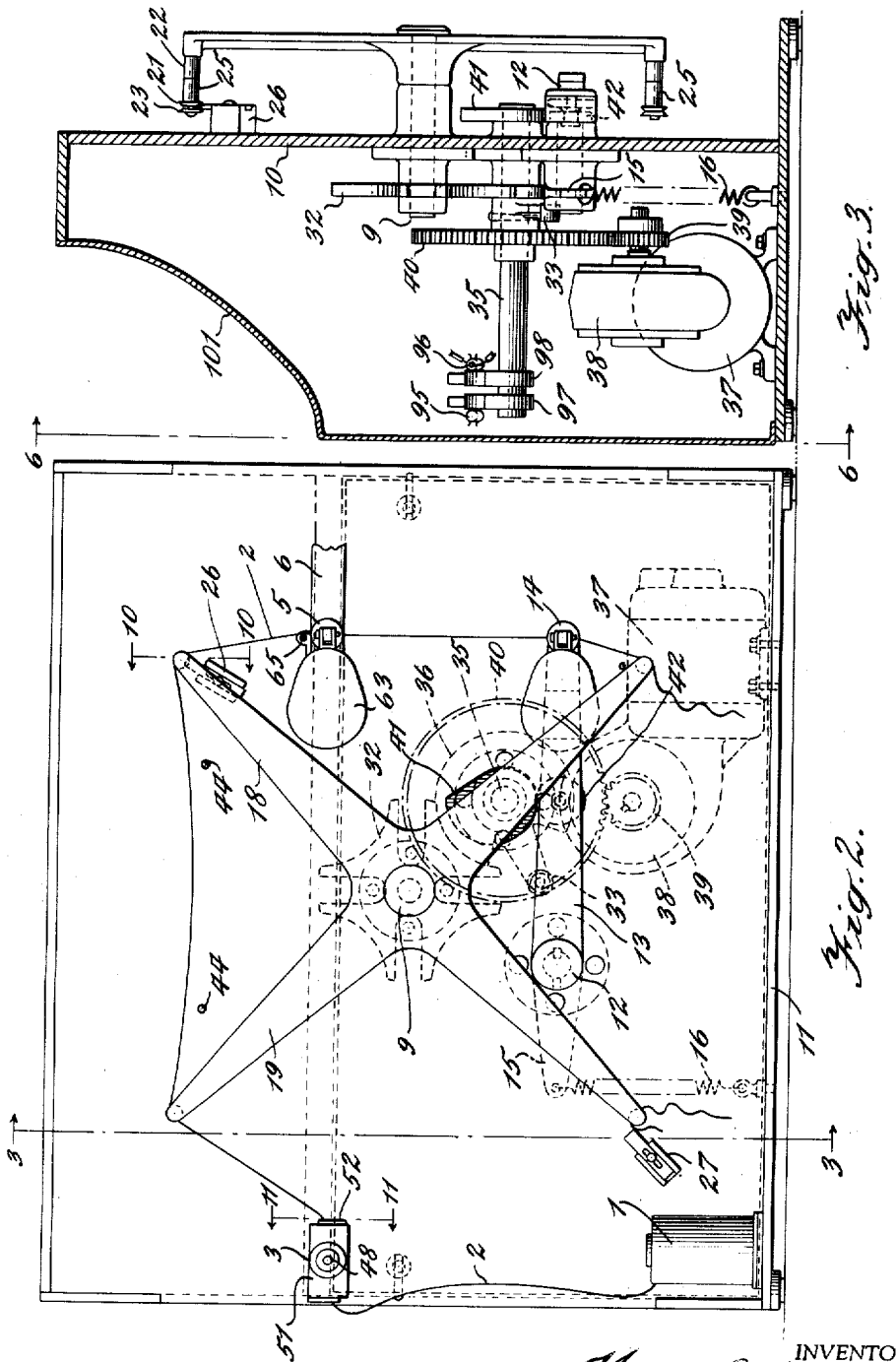

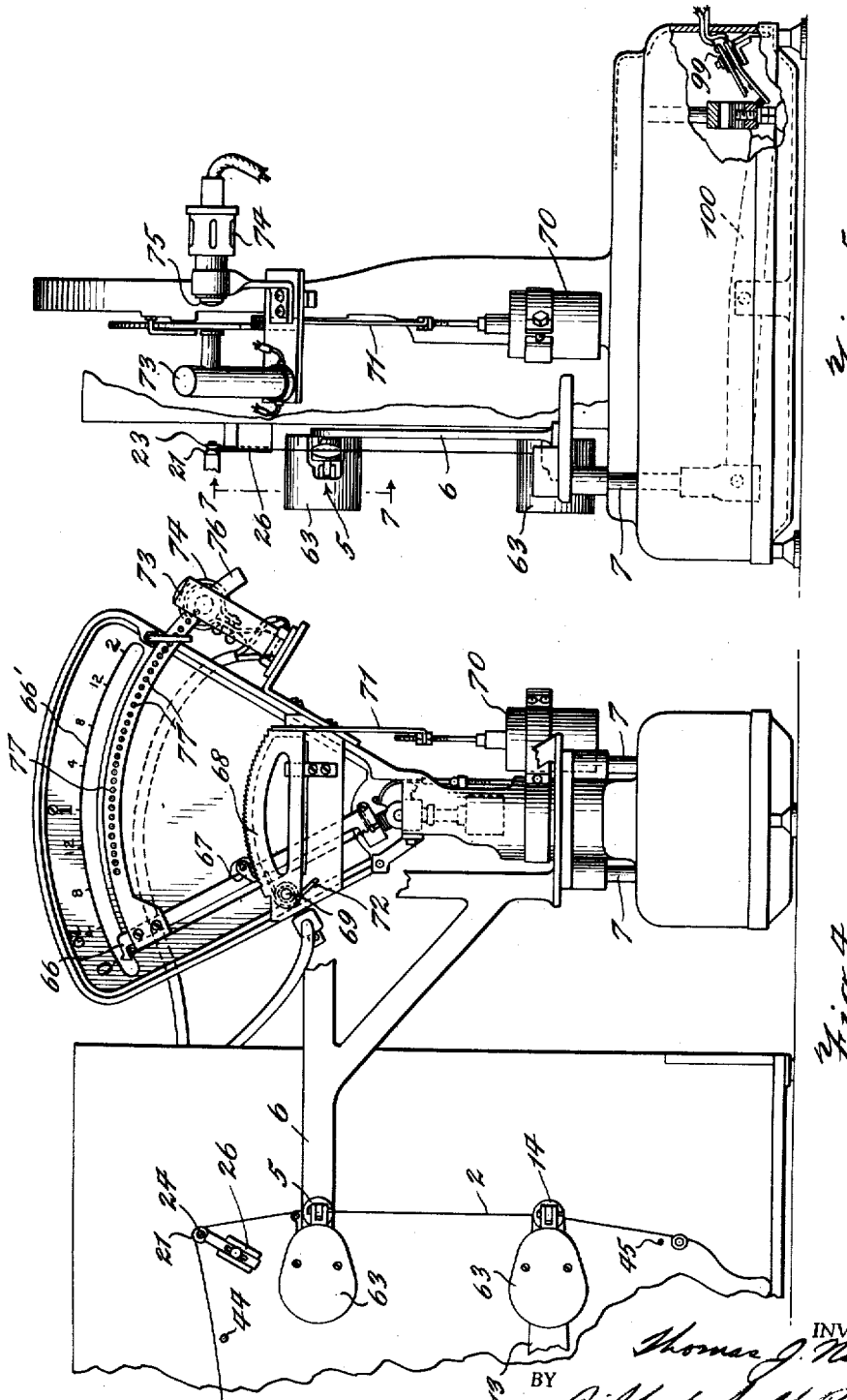

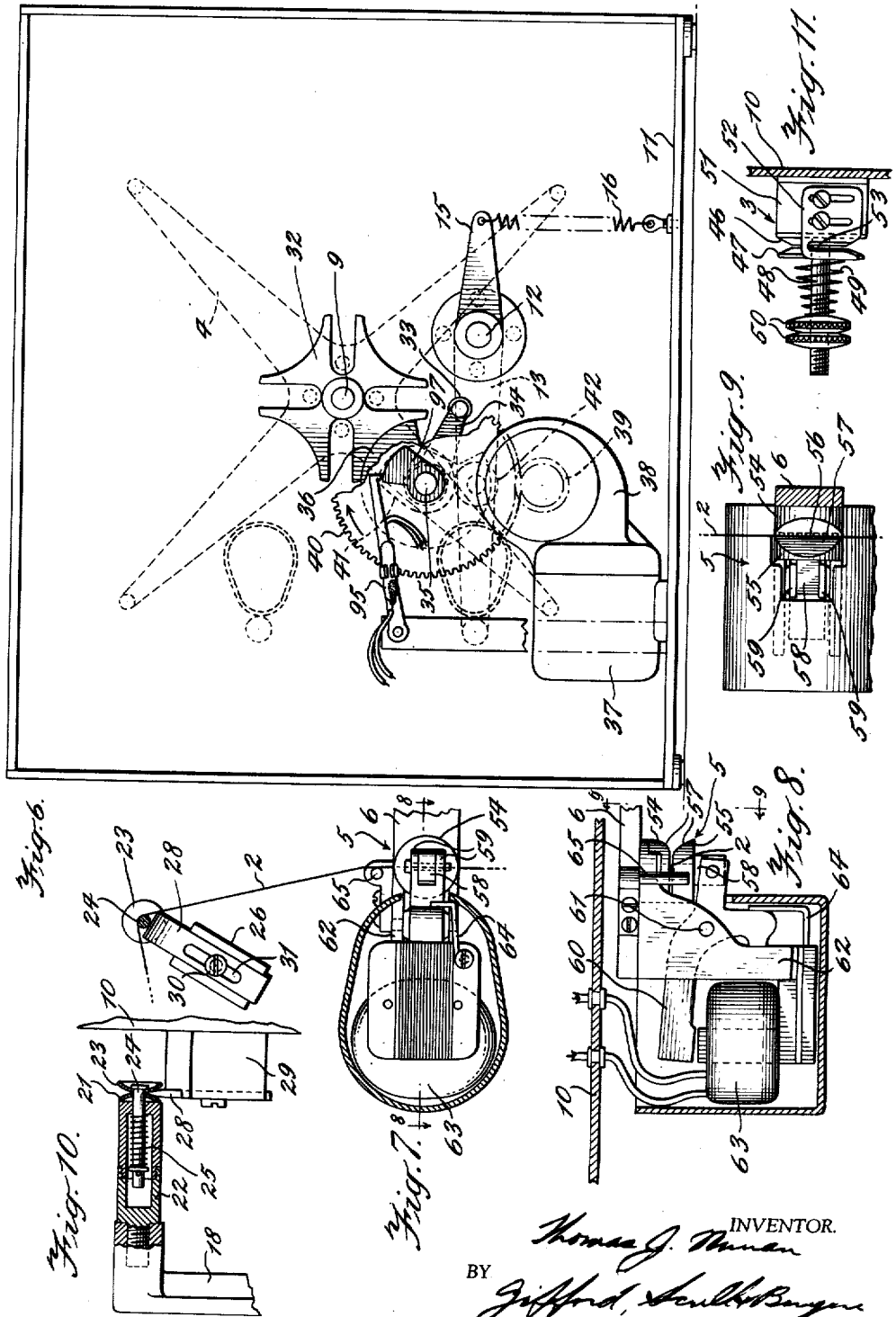

INVENTOR.
Thomas J. Nunan
BY
ATTORNEY.

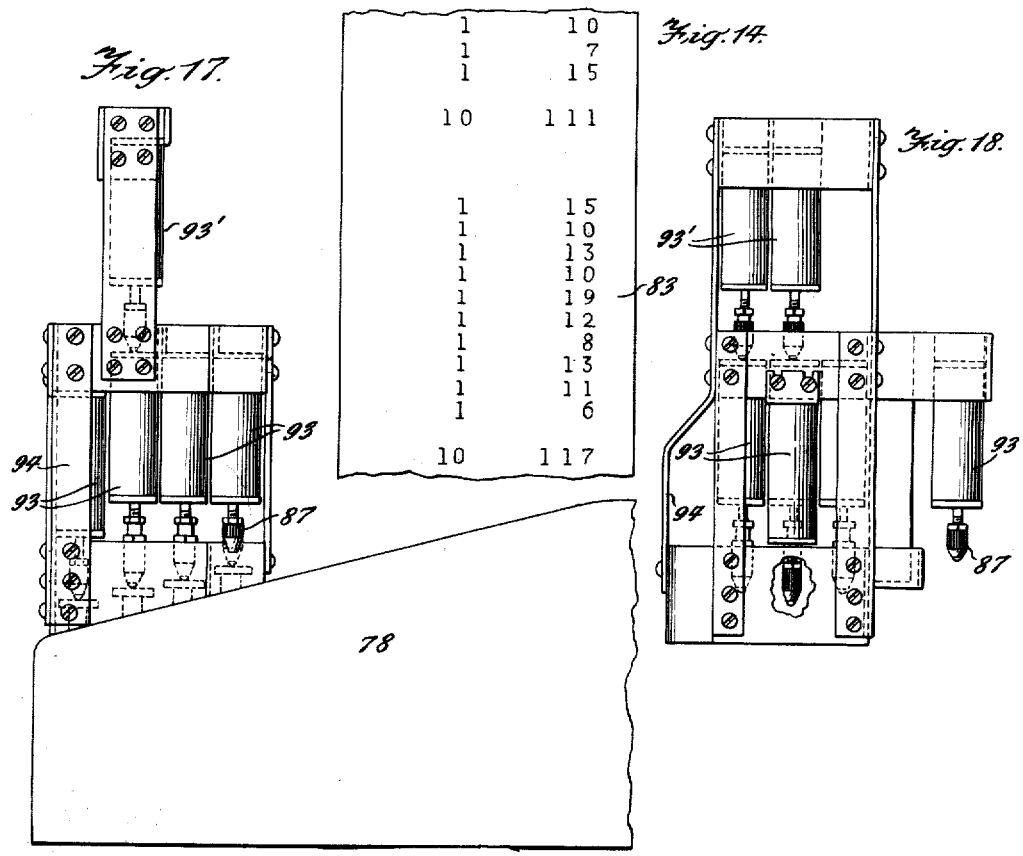

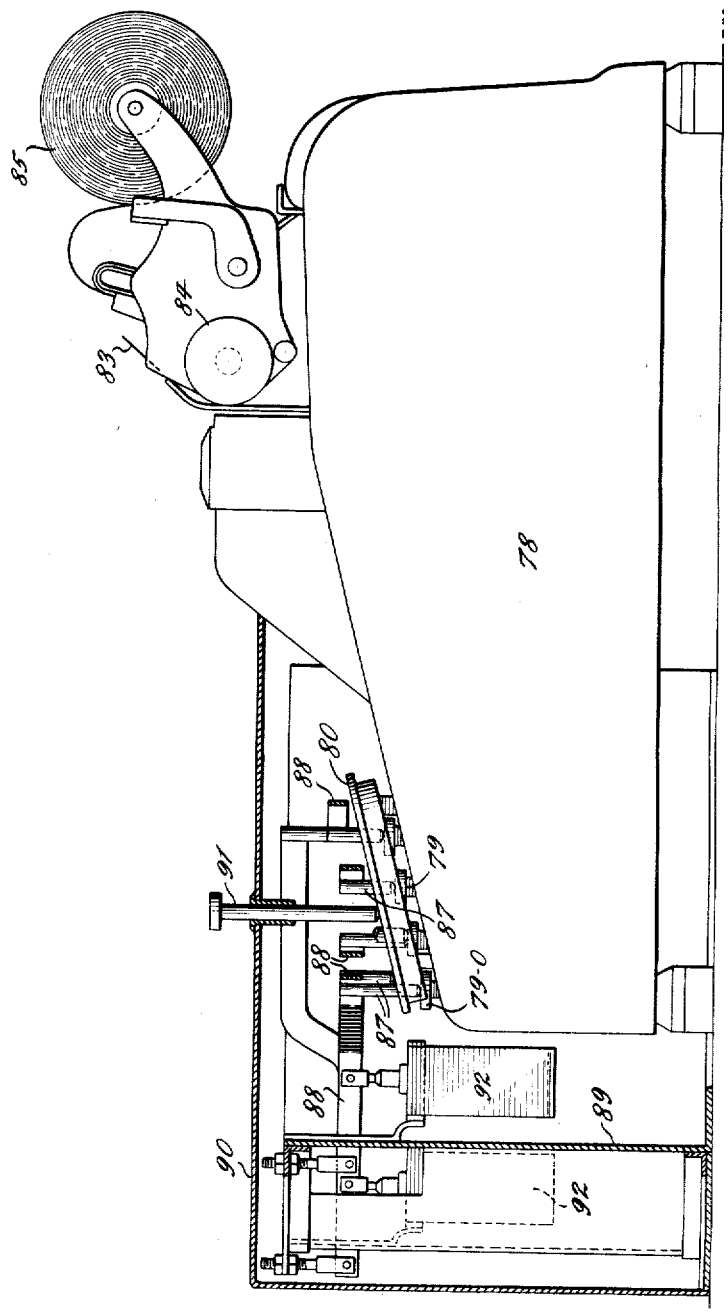

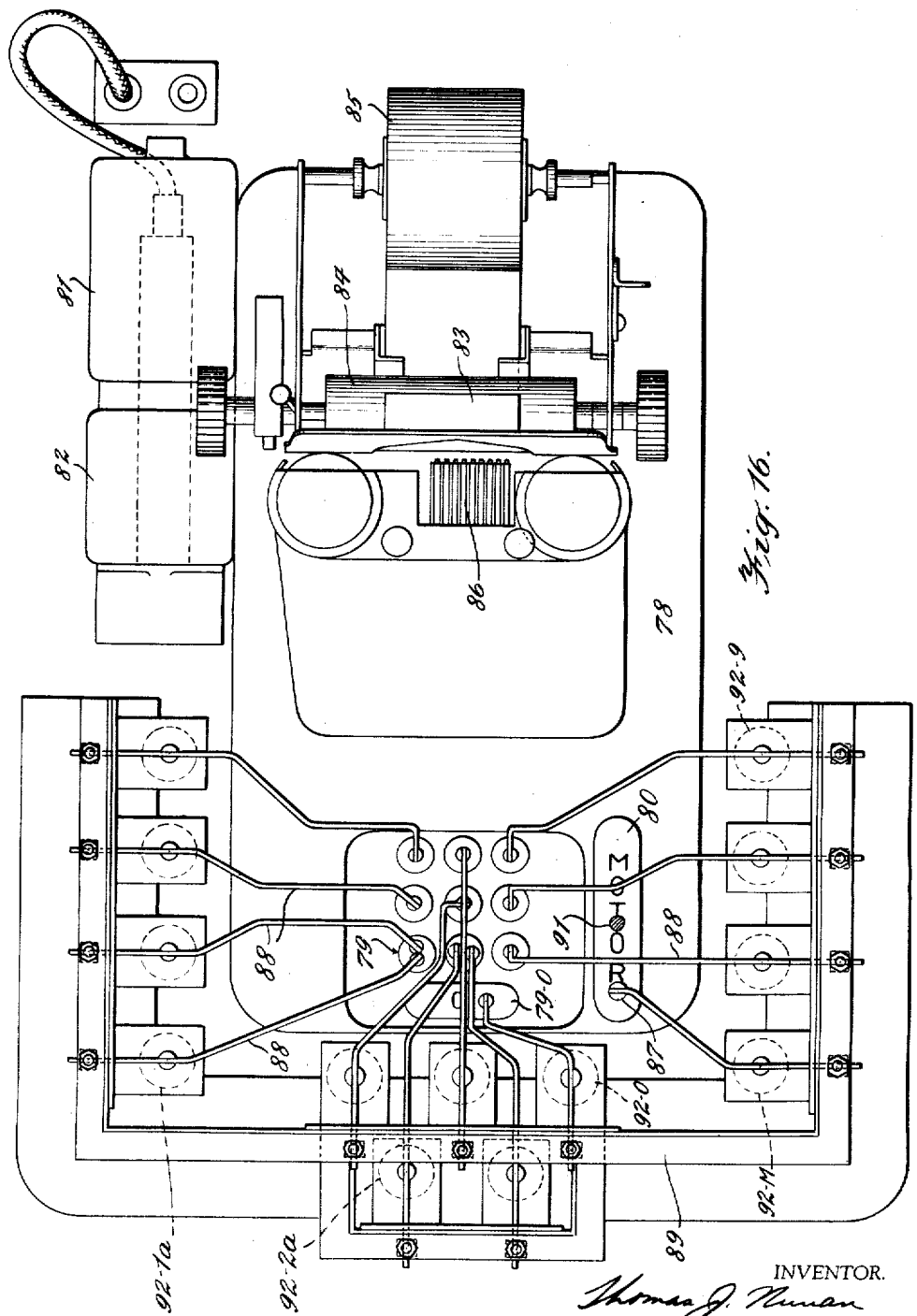

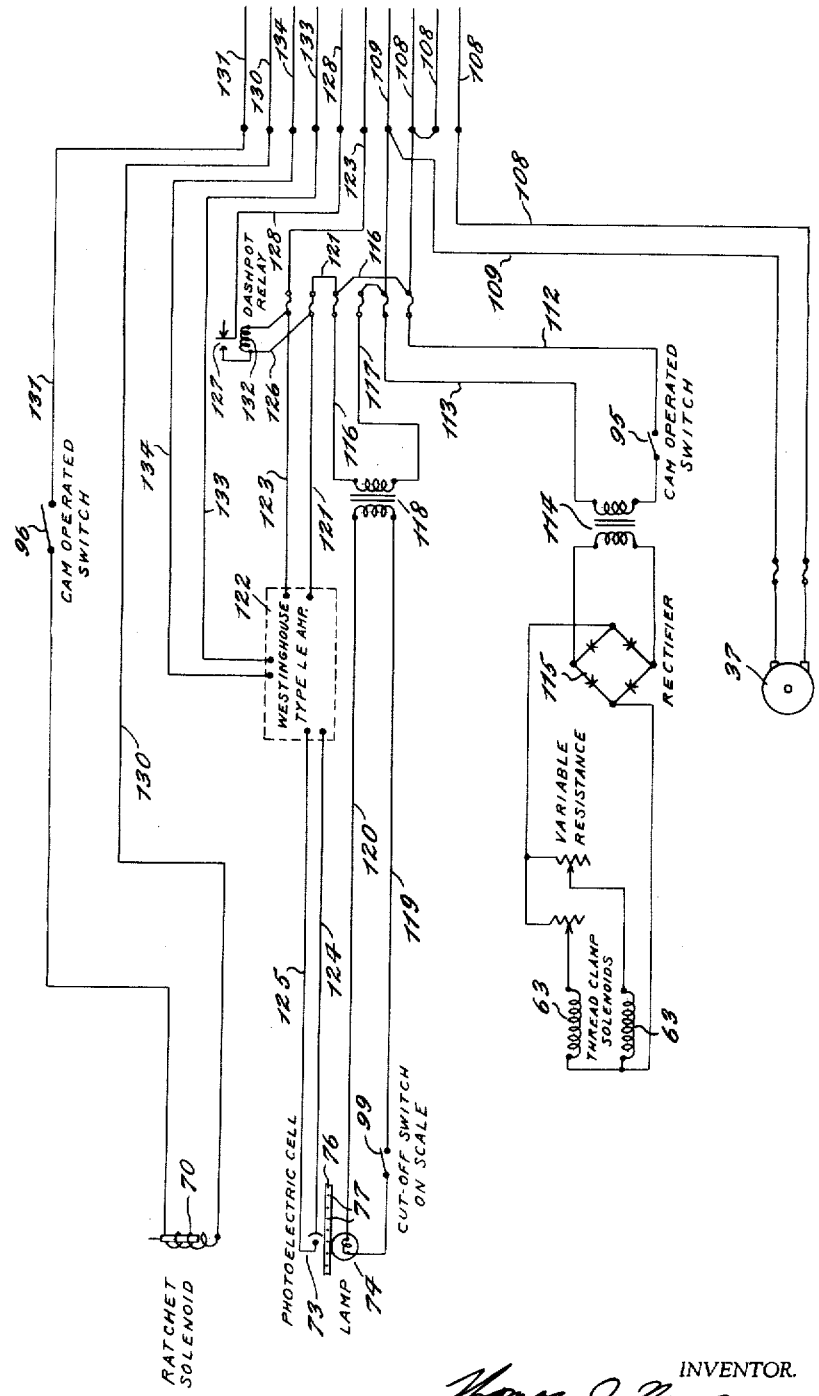

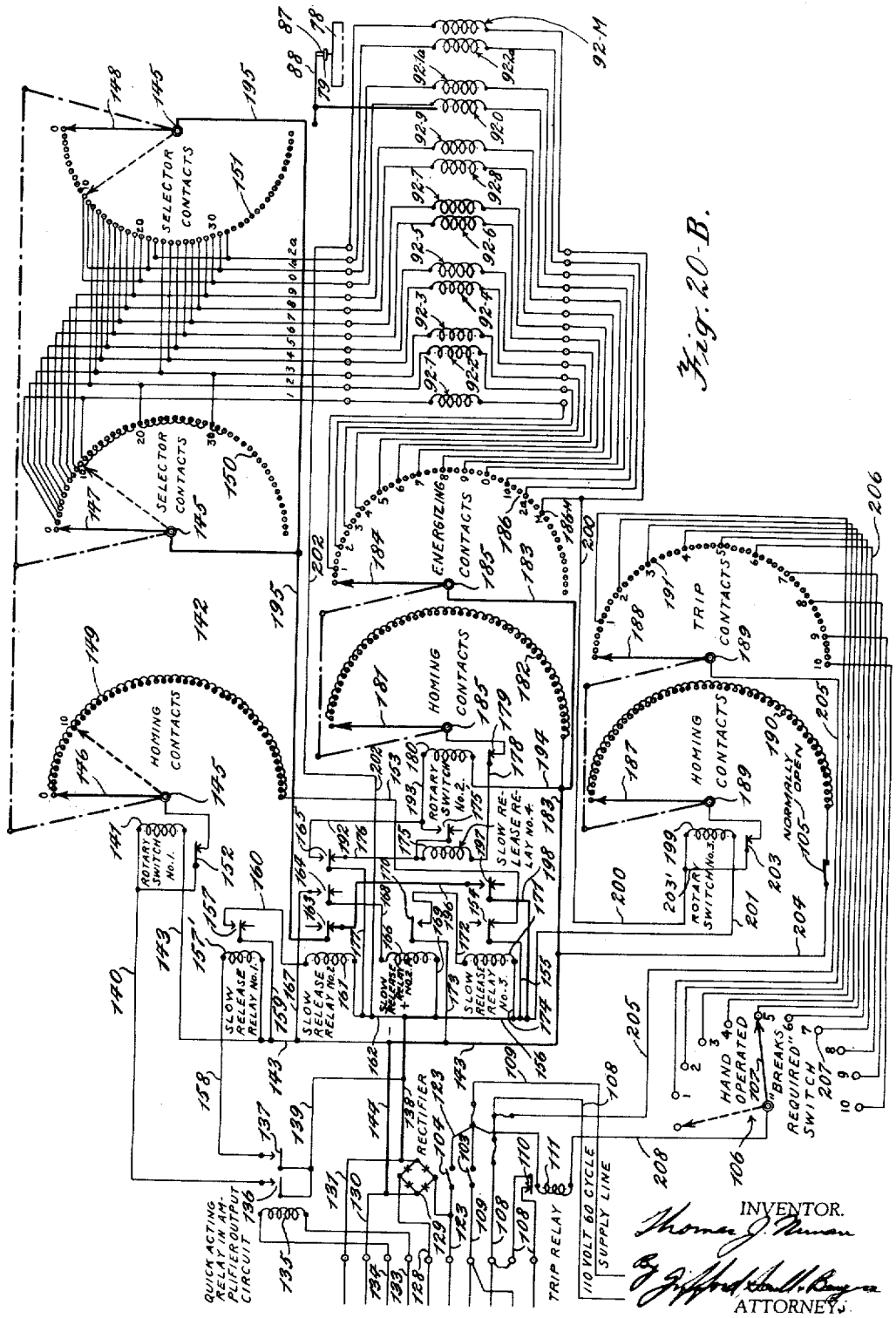

Jan. 3, 1939. T. J. NUNAN 2,142,252
RECORDING DEVICE
Filed March 4, 1937 12 Sheets-Sheet 11

INVENTOR.
BY
ATTORNEYS.

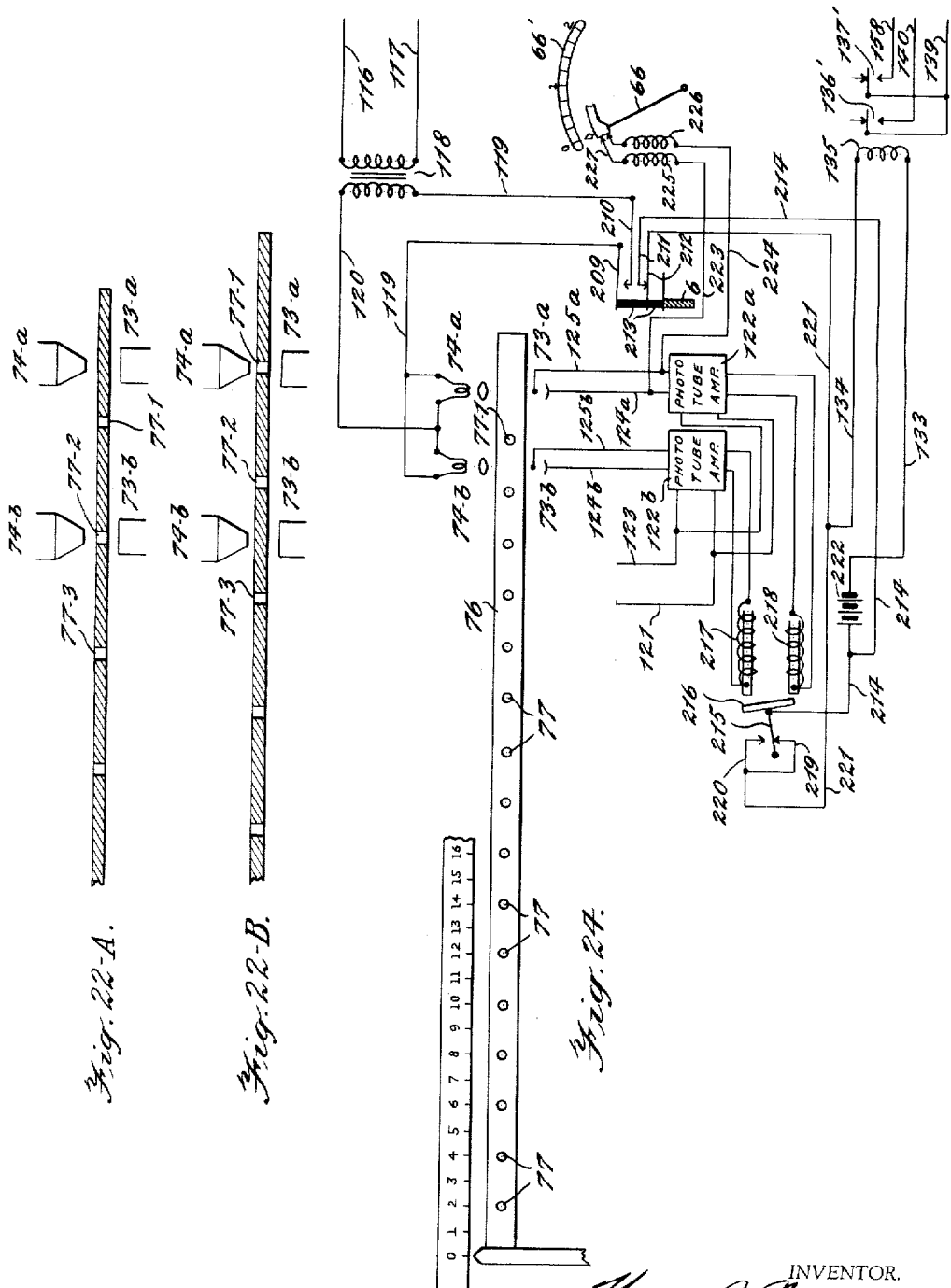

Patented Jan. 3, 1939

2,142,252

UNITED STATES PATENT OFFICE 2,142,252

RECORDING DEVICE

Thomas J. Nunan, Summit, N. J., assignor to The Clark Thread Company, Newark, N. J., a corporation of New Jersey Application March 4, 1937, Serial No. 128,995

9 Claims. (Cl. 234—5.4)

This invention relates to a novel and improved recording device, and this application is a continuation in part of divisible subject matter contained in my copending application Ser. No. 9,428, filed March 5, 1935. The novel features of the invention will be best understood from the following description and the annexed drawings, in which I have shown selected embodiments of the invention and in which:

Fig. 2 is a view of an enlarged scale taken on the same plane as Fig. 1 and showing more of the details of construction;

Fig. 3 is a view taken approximately on the line 3—3 of Fig. 2;

Fig. 4 is a view of an enlarged scale likewise taken on the same plane as Fig. 1 but with certain parts removed so as to show details of construction;

Fig. 5 is a view taken from the right of Fig. 4 showing the structure appearing in that figure, parts here also being broken away, better to show certain details;

Fig. 6 is a view taken approximately on the line 6—6 of Fig. 3, but with the back of the casing removed and with parts being broken away to show details of construction;

Fig. 7 is a view on an enlarged scale taken approximately on the line 7—7 of Fig. 5;

Fig. 8 is a section approximately on the line 8—8 of Fig. 7;

Fig. 9 is a view approximately on the line 9—9 of Fig. 8;

Fig. 10 is a view also on an enlarged scale taken approximately on the line 10—10 of Fig. 2;

Fig. 11 is a view on an enlarged scale taken approximately on the line 11—11 of Fig. 2;

Fig. 14 is a face view of a fragment of the record strip printed by operation of the device;

Fig. 15 is a side elevation of a recorder and the operating mechanism therefor;

Fig. 16 is a plan view of the structure appearing in Fig. 15 but with the casing top removed and certain parts shown in section;

Fig. 17 is a view taken on the same plane as Fig. 15 but showing a different form of operating mechanism for the recorder;

Fig. 18 is a view of the structure of Fig. 17 as seen from the left of that figure;

Fig. 19 is a top view of the structure appearing in Fig. 18;

Figure 21:
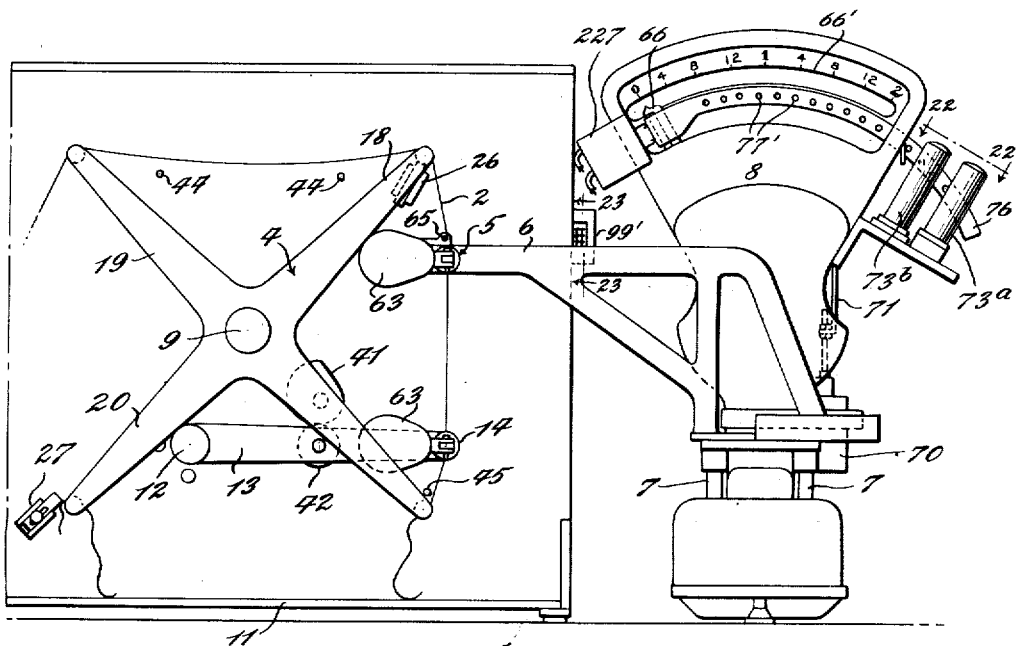
Figures 22, 23:
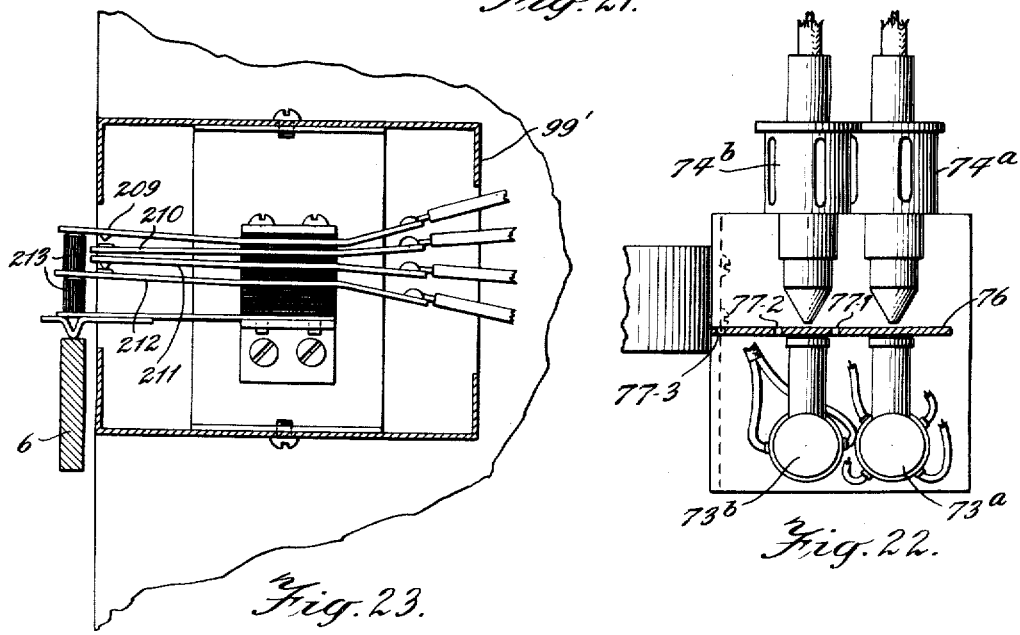

Figs. 20—A and 20—B together form a wiring diagram illustrating one means by which the device may operate, certain of these two figures overlapping slightly;

Fig. 21 is a view corresponding generally to Fig. 4 but showing different embodiments of certain parts of the invention;

Fig. 22 is a view substantially on the line 22—22 of Fig. 21, parts being shown in section;

Figs. 22—A and 22—B are diagrams showing certain of the parts shown in Fig. 22 but in different positions;

Fig. 23 is a detail view approximately on the line 23—23 of Fig. 21;

Fig. 24 is a wiring diagram illustrating the operation of the embodiment shown in Figs. 21, 22, 22—A, 22—B, and 23, and showing how that embodiment can be used in connection with the wiring diagram of Figs. 20—A and 20—B.

For the purpose of illustration, I have shown the recording device as employed in connection with a thread testing apparatus designed to break successive lengths of thread, and the recording device may be used to record the amounts of force thus employed to break the thread. The invention, however, may be used for recording other data wherever found applicable.

Figure 1:
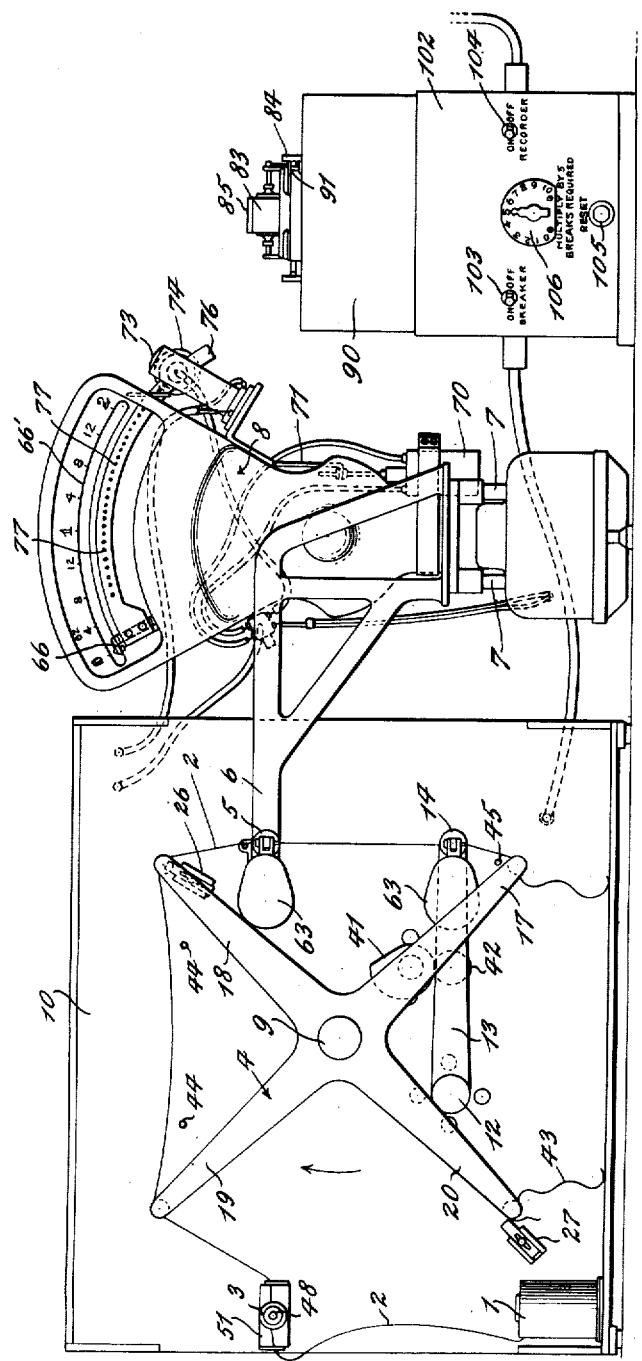
Fig. 1 is a vertical face view of a selected embodiment of the invention.

Referring first to Fig. 1, I have shown therein a thread cylinder 1 forming a source of supply for thread to be tested and from which the thread 2 passes through a tension device 3 of any suitable construction and is then carried by a rotary frame 4 to a clamp 5 supported upon a bracket 6 secured to a movable part 7 of a scale 8. The scale is selected as a suitable form of indicator or measuring instrument and may be of any of the well-known forms which may be found suitable for the purpose. Therefore the details of the scale mechanism will not be described except as they are of interest in understanding the invention. The indicating part of the measuring instrument may be omitted entirely for some purposes, and therefore the word "indicator" is used merely for convenience of expression.

For the purpose of convenience I shall refer to the clamp 5 as the indicator clamp, since it moves with the indicator.

The frame 4 is rotatably mounted about its axis 9 on a suitable support 10, here shown in the form of a panel extending upwardly from a base 11, and is operated in a clockwise direction, as viewed in Fig. 1. The operating means will be more fully described presently.

Rotatably mounted upon the panel 10 is a rock shaft 12 having on the front of the panel a lever 13 secured thereto, and upon the outer end of this lever is a clamp 14 which, for the sake of convenience, I shall refer to as the breaking clamp. As best shown in Figs. 2 and 6, on the back of the panel 10 the rock shaft 12 has an arm 15 which is urged towards the base 11 by means of a spring 16.

By means to be described later, the clamps 5 and 14 are periodically operated in synchronism with the movement of the lever 13 and the frame 4. The frame 4, as indicated, comprises a plurality of arms, here shown as four in number and which I have designated as 17, 18, 19, and 20, and is given an intermittent rotation in the direction indicated by the arrows in Figs. 1, 2, and 12.

On the end of each of the arms 17, 18, 19, and 20 is a feed clamp, the construction of which is best shown in Fig. 10. Here the clamp is shown as formed of two jaws, one jaw 21 being stationary and secured to the end of a horizontally extending tubular finger 22. The other jaw 23 is movable and is mounted upon a plunger 24 slidably mounted in the tubular finger 22 and normally urged towards the left of Fig. 10 by means of a light spring 25 which engages between the end of the tubular finger and an abutment on the plunger.

The strength of the spring 25 is such that the jaws 21 and 23 will yieldingly clamp a thread between them with sufficient force to pull the thread from the source of supply 1.

It will be seen that the jaws flare outwardly from each other towards their peripheries in order to receive the thread and also in order to permit forcing of the jaws apart at certain points. This forcing apart may be done by a release 26 or 27 (Figs. 1 and 2) of identical construction, and details of which are better shown in Figs. 7 and 10. It will be seen that each release comprises a wedge 28 slidably mounted on a block 29 secured to the panel 10 and held in adjusted position by means of a screw 30 received in a slot 31. The wedge moves in suitable guideways on the block, as indicated.

The intermittent motion of the frame may be caused by any suitable means, here exemplified by a Geneva cross 32 mounted upon the shaft 9 on the back of the panel 10 and operated by a pin 33 on an arm 34 secured to a shaft 35. Associated with the arm 34 is the usual disk 36 engaging the arcuate portions of the cross to hold it against movement when the pin 33 is not operating. Of course, other suitable types of intermittent movements may be used.

The shaft 35 is rotated from a motor 37 which, through a gearing train contained in a gear box 38, rotates a pinion 39 meshing with a gear 40 secured to the shaft 35. The shaft 35 forms a cam shaft extending through the panel 10 in which it is supported by suitable bearings, and on the front end thereof it carries a cam 41 engaging a cam roller 42 upon the lever 13.

Assuming that the parts are in the positions shown in Figs. 1 and 2, the thread is carried from the source of supply 1 through the tension device 3 over the clamps on the arms 19 and 18 and through the clamps 5 and 14. The clamp on the arm 19 will be closed so that the thread will run freely over that clamp, the jaws thereof forming a guide for the thread. The jaws of the clamp on the arm 18 will be held open by the release 26 so that while the thread may still run freely between those jaws, nevertheless when the jaws are closed the thread will be held therebetween.

The end of the thread below the clamp 14 will be inserted between the jaws of the clamp on the arm 17 so as to be held to that arm.

Figure 12:
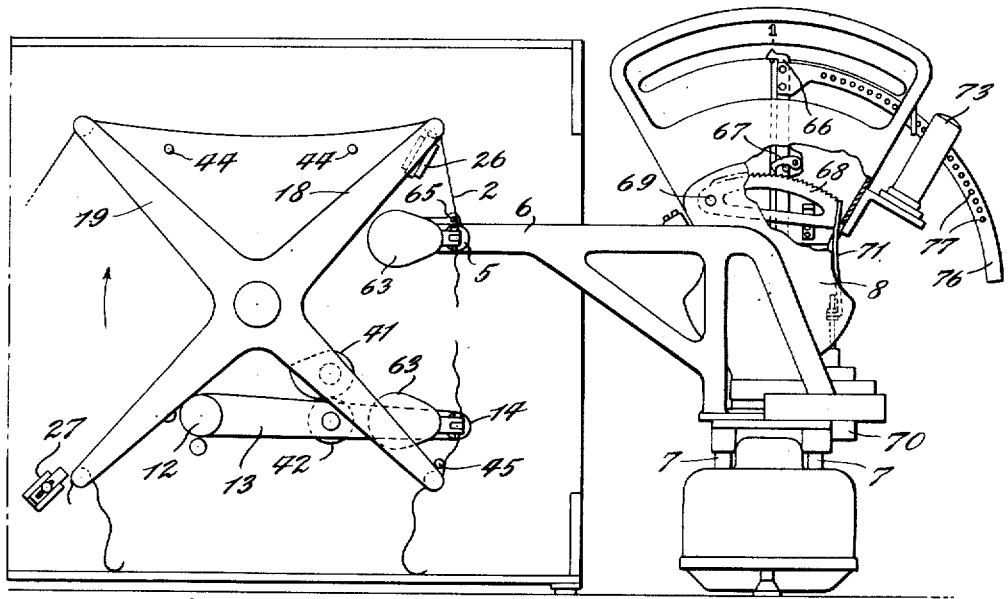
Fig. 12 is a fragmentary view corresponding to Fig. 1 but showing certain of the parts in different positions.

The motor 37 can now be put in operation and the shaft 35 will be rotated, causing the cam 41 to rotate in a counterclockwise direction as seen in Figs. 1, 2, and 12, and depress the lever 13. As the lever 13 moves downwardly, it will carry with it the clamp 14 and the thread held therein. The thread will exert a tension upon the clamp 5 and thus upon the bracket 6, and will actuate the indicator exemplified by the scale. The cam 41 is so designed as to insure that the thread will break between the clamps 5 and 14 while the frame 4 is still stationary and before the pin 33 engages the Geneva cross. The approximate positions which the parts will now occupy are indicated in Fig. 12.

After the thread is thus broken, the frame will be rotated by the intermittent movement, it being noted that the arm 34 and cam 41 are so positioned on the cam shaft 35 that the frame is held stationary during depression of the lever 13 by the cam 41. The clamps 5 and 14 are released by means to be described later, and then the frame 4 will be rotated in the direction of the arrows indicated in Figs. 1 and 2. This rotation of the frame will cause the feed clamp on the end of the arm 19 to move away from the release 26 so that the jaws 21 and 23 of that clamp will come together and hold the thread therebetween. The thread will still be loosely received between the jaws of the feed clamp on the end of the arm 19, and as the frame rotates the thread will be pulled down between the jaws of the clamps 5 and 14 which are now open and the arm 20 will move upwardly to the position shown as occupied by the arm 19. The arm 19 will occupy the position shown as occupied by the arm 18, and as it reaches that position, the feed clamp on the end thereof will be opened by the release 26. The arm 18 with the thread secured thereto will have moved down to the position shown as occupied by the arm 17, and it will thus be seen that the thread is carried through the jaws of the clamps 5 and 14 by a single feed clamp on the end of one of the arms of the frame and that it is free, from that feed clamp back to the tension device 3, so that it will be stretched taut between the clamps 5 and 14.

The arm 17 with the loose end of thread will have moved to the position shown as occupied by the arm 20, and on the next intermittent movement of the frame, the loose end 43 will be released from the feed clamp on that arm by means of the release 27, which is identical with the release 26.

The clamps 5 and 14 will be again closed, by means to be described later, and the operation will be repeated.

Figure 13:
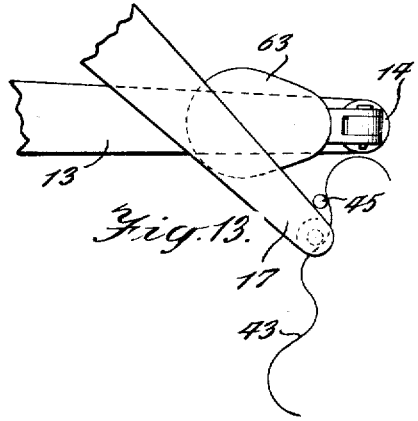
Fig. 13 is a view of a fragmentary portion of Fig. 12 illustrating the operation of the parts shown therein.

Between the two uppermost arms of the frame, here shown as the arms 18 and 19, may be placed pins 44 to prevent excessive sagging of a heavy thread. A similar pin 45 is placed in some such position as shown in Figs. 1 and 13, for example, so that as a thread end 43 is formed by breakage of the thread, and by being released from the clamp 14 it will fall outwardly and thus not wrap around the plunger 24 of the feed clamp on that arm of the frame. In other words, the thread end is placed in such a position that it will readily drop when the release 27 operates on the feed clamps passing it.

The tension device 3 may be of any suitable construction, although in Fig. 11 I have shown one form which has been found satisfactory. In this form, the thread is permitted to run between two guides 46 and 47 loosely mounted upon a spindle 48 and lightly held together by a spring 49 which may be adjusted by means of the nuts 50. The spindle 48 is mounted on a block 51 secured to the face of the panel 10, and at one end of that block is shown a guide plate 52 having a downwardly opening slot 53 to receive the thread. This guide plate 32 may be mounted for vertical movement on the end of the block by the screw and slot arrangement indicated in Fig. 11.

The indicator clamp 5 and the breaking clamp 14 may be of substantially identical construction except that one is secured to the bracket 6 and the other to the lever 13. Therefore a description of one will suffice for both, and in Figs. 7, 8, and 9 I have shown the details of the indicator clamp 5.

The clamp 5 is shown as formed of two jaws, a relatively stationary jaw 54 secured to the bracket 6 and a relatively movable jaw 55. One of these jaws, here shown as the jaw 54, has a face formed of a plurality of corrugations 56 extending transversely to the length of the thread 2, as best shown in Fig. 9, and both jaws are shown as having faces with edges 57 flaring outwardly from each other so as to form a flaring mouth to facilitate insertion of the thread between the jaws.

The jaw 55 is shown as having an ear 58 pivotally received between ears 59 on a lever 60 pivoted at 61 upon an arm 62 secured to the bracket 6. This arm carries a magnet or solenoid 63 of which the lever 60 forms the armature. By means of the solenoid the jaw 55 may be moved towards the jaw 54 at the correct times, by means to be described later, while, upon deenergizing of the solenoid, a spring 64 may be used to force the jaw 55 away from the jaw 54.

Mounted on the bracket 6 above the clamp is shown a guide pin 65 to guide the thread 2 into position between the jaws.

Referring now to Figs. 1, 4, 5, and 12, it will be seen that as the breaking clamp exerts tension on the thread to break it, it causes the bracket 6 to move downwardly and thus to actuate the scale or other indicator, as previously described. For example, in Fig. 12 I have shown a situation where the thread has been broken after an exertion thereon of a force of one pound, which is indicated by the pointer 66 of the scale. Attached to the pointer is a pawl 67 cooperating with a ratchet 68 having thereon as many teeth as there are units on the scale face 66', whereby the pointer will not return to zero until the pawl and ratchet are released from engagement. Such release may be effected at the proper time by the construction of the ratchet indicated. It will be seen that the ratchet is pivoted at 69 upon the frame of the scale and may be moved down by action of a solenoid 70 pulling upon a rod 71 fastened to the ratchet, this pull being against the action of a coil spring 72 which tends to hold the ratchet in its uppermost position to contact with the pawl 67. In Fig. 12 I have shown in dot and dash lines the position of the ratchet as it is depressed or pulled down to release the pawl and consequently the pointer.

In the embodiment being described, the operation of many of the different elements is controlled by electrical circuits, and these circuits in turn may be controlled by means of a light sensitive element, such as a photo-electric cell of known construction, which is shown at 73. The cell may be acted upon by a lamp indicated at 74, and light from which passes through a lens 75 which is directed towards the cell 73.

Between the lamp and the cell is disposed a shutter 76 of arcuate form concentric with the center of movement of the pointer 66 and having therein a plurality of holes 77 likewise arranged on an arc concentric with the center of movement of the pointer. The shutter, lamp, and cell are so arranged that, as the pointer moves, the shutter will pass between the lamp and cell so that the lamp may act upon the cell through the holes as they pass successively between the lamp and cell. The result will be a series of electrical impulses, as is well known to those skilled in the art, and by making the holes correspond in number to the units of force indicated by the indicator, or by having those holes occupy a certain predetermined relation to such units of force, the impulses may be used as a measure of that force. In this illustrated embodiment, it will be assumed that when the pointer 66 is at zero position, the lamp and cell will be opposite an opaque portion of the shutter spaced from the first hole a distance equal to the hole spacing.

The action of the light upon the cell will cause a variation in the resistance of an electrical circuit, as is well known in the electrical art, and these variations or impulses are employed to operate a recorder, here shown in the form of a calculating machine 78, indicated, for example, in Figs. 15 and 16. This calculating machine may take any desired form, but for the sake of illustration, I have shown a machine of a well-known type having a small number of keys on the keyboard, although the invention is not limited to the use of that particular machine.

The recorder or calculating machine illustrated comprises a keyboard having nine keys 79 numbered from 1 to 9, as usual, and which I shall refer to as 79—1 to 79—9, inclusive. These keys are adapted to print the numerals 1 to 9, inclusive, in a manner well known in the art. The machine is likewise provided with a key 79—0 adapted to print the character 0 and with a key 80 which is marked "Motor" in Fig. 16 and which is adapted to actuate a motor 81 which actuates the machine mechanism through a gearing contained in a gear box 82 to record a computation. The recording is done on a record strip of paper indicated at 83 and which is supplied to the platen 84 from a roll 85. Printing is done by actuation of the type bars 86 in the usual manner.

Disposed above and in contact with each key is an operating finger 87, each mounted upon a lever 88 which is pivoted on a frame 89. This frame may be made detachable from the recorder and moved into operative position with respect thereto without any change whatsoever in the mechanism of the recorder. The frame and mechanism carried thereby may be provided with a cover 90 through which the stem 91 of a hand-operated key may pass, the bottom of the end of which contacts with the key 80 so that the motor may be operated by hand to total the computation.

Since this particular machine has only ten keys for the recording of digits, and since certain recorded figures may require two actuations of certain keys, I arrange additional fingers over certain of the keys. In the illustrated embodiment, I contemplate the use of an indicator which will indicate breaking strengths up to two pounds or thirty-two ounces, and the recording is done in ounces. In order to so record, I provide additional fingers over the keys 19—1, 19—2, thereby making possible double actuation of these keys so as to give any quantity up to 32. This arrangement of double fingers for certain keys is employed for the sake of convenience of arrangement of the circuits used to operate the various fingers.

Each lever 88 is adapted to be operated by a solenoid 92. There are thirteen such solenoids, one for each of the thirteen levers, and for convenience they will be designated according to the key which they operate, as 92—0 to 92—9, inclusive, 92—1a, and 92—2a. The solenoids are adapted to operate the fingers acting upon the keys 19—0 to 19—9, inclusive. The solenoid adapted to actuate the key 80 will be designated as 92—M.

In Figs. 17, 18, and 19 I have shown another form which may be used to operate a recorder, such as the machine 78. In this form, the various fingers 87 are attached directly to the armatures of solenoids 93 disposed coaxially with the fingers and mounted for vertical movement upon a frame 94. The number of fingers and solenoids is the same as in the other embodiment just described, it being noted, however, that two of the solenoids, here identified as 93', are mounted directly above two other solenoids and in position to have their armatures act upon the armatures beneath them, in order to provide for two operations of the keys numbered 1 and 2. The frame may be conveniently rested upon the machine 78 as a self-contained unit, in the same manner as is the frame 89. For some machines, however, I have found that it is better to use the arrangement shown in Figs. 15 and 16.

I shall now describe the electrical circuits shown in Figs. 20—A and 20—B and which are arranged to control the operation of the mechanism previously described. These circuits include certain switches shown in the other figures previously described. Two of such switches are indicated in Figs. 3 and 6 as mercury switches 95 and 96, each operated by a cam 97 and 98, respectively, on the cam shaft 35. The switch 95 is used to control the solenoids 63 operating the indicator clamp 5 and the breaking clamp 14, these two clamps operating in unison, and the switch 96 is used to control the solenoid 70 for depressing the ratchet 68. The switch 95 is normally open and the switch 96 is normally closed.

In Fig. 5 is shown another switch 99, which is a cut-off switch controlled by the movement of the beam 100 of the scale. When the downward movement of the bracket 6 causes movement of the element 7, the right-hand end of the beam in Fig. 5 is raised, permitting the switch 99 to close, but when the scale is not being operated, this switch is open. The shutter 76 has an opaque portion disposed between the lamp and the cell when the scale is inoperative, that is to say, when the pointer is at zero position, and the contacts of the switch 99 are so designed that they will come into engagement with each other and close the switch by the time that the shutter has moved a sufficient amount so that the light from the lamp will pass through the first one of the holes 77 corresponding to the first ounce.

Upon return movement of the scale beam to initial position, it will open the switch 99, the pointer and shutter being retained, however, by the pawl and ratchet until operation of the solenoid 70, the scale construction readily permitting this action. In this way I insure against passage of light through the holes in the shutter on its return movement.

Most of the circuits appearing in Fig. 20—A are disposed upon the scale or beneath the cover 101 shown in Fig. 3, whereas most of the circuits appearing in Fig. 20—B will be disposed in a cabinet 102 shown in Fig. 1. On the face of this cabinet may be conveniently arranged means to operate certain switches, such as the "breaker" switch 103, the "recorder" switch 104, and the "reset" switch 105, the switch 105 being normally open.

One of the features of my invention is the provision of means for automatically operating the device so that any required number of breaks may take place, and then the operation of the device will automatically cease. For example, if it is desired to test a thread by breaking it twenty-five times, the device may be automatically set so that twenty-five lengths of thread will be brought into engagement with the two clamps 5 and 14 and broken, the force required to cause each break recorded, and the number of operations and total force recorded. The total force may then be readily divided by the number of breaks to obtain the average strength determined by the run of tests.

In order to control this operation of the device, I provide a "breaks required" switch 106, which may include a pointer, as shown in Fig. 1, adapted to move over a numbered face, and connected to a contact 107 (Fig. 20—B). I find it convenient to have the face numbered so that by moving the pointer from one number to another, the number of breaks may be varied by five. For example, in Fig. 1, the pointer is shown as resting upon the numeral 5, which means that when the device is operated with the pointer so set, the thread will be broken twenty-five times during the run of the tests.

In Fig. 20—B, I have shown conventionally the thirteen solenoids 92—1, etc., adapted to operate the various fingers which in turn actuate the keys of the recorder. In order to avoid confusion, I have omitted from Fig. 20—B these elements operated by the solenoids, except diagrammatically, in one instance.

Electric current may be supplied to the device from any suitable source, here indicated in Fig. 20—B as two line conductors 108 and 109 carrying a 110 volt, 60 cycle, alternating current. The conductors 108 and 109 lead to the opposite sides of the motor 37, the conductor 108 having therein a switch 110 operated by a solenoid 111, the switch and solenoid together forming what for convenience may be referred to as the "trip relay". The function of this trip relay will be more fully discussed later.

The solenoids 63 are connected by conductors 112 and 113 to the conductors 108 and 109, respectively, and lead through the primary of a transformer 114, the secondary of which is connected through a rectifier 115 with the solenoids 63, these solenoids being arranged in parallel with each other through variable resistances, if such are desired. The purpose of the rectifier is to provide a one-way current through the solenoids, as will be apparent to those skilled in the art.

In the conductor 112 is shown the cam-operated switch 95, which switch thus controls the operation of the solenoids, and it will be seen that this operation is also controlled by means of the "breaker switch" 103 shown as located in the conductor 109.

The lamp 74 is likewise connected by means of the conductors 116 and 117, to the conductors 108 and 109 and lead therefrom to the primary of a transformer 118, the secondary of which is connected to the lamp 74 by the conductors 119 and 120. It will be seen that the cut-off switch 99 shown located on the scale in Fig. 5 is indicated in the conductor 119, and therefore this switch controls the operation of the lamp.

Energy is also supplied to the photo-electric cell 73 from the conductors 108 and 109 through an amplifier 122 connected to the conductor 108 by the conductors 116 and 121 and to the conductor 109 by means of the conductor 123. This amplifier may be of any suitable construction, the details of which are not necessary to an understanding of this invention. From the amplifier 122 lead two input leads 124 and 125 to opposite sides of the cell 73. The "recorder switch" 104 is shown as being located in the conductor 123 and thus this switch controls the amplifier and through the amplifier controls the operation of the photo-electric cell, as well as of other elements to be described later.

The ratchet solenoid 70 may be connected through the conductor 116 connected to one of the line conductors 108, part of the conductor 121, conductor 126, switch 127, conductor 128, rectifier 129, conductor 130, to one side of the solenoid. The other side of the solenoid 70 may be connected to the line conductor 109 through the conductor 131, rectifier 129, switch 104, and conductor 123. It will be noted that the switch 96 is located in the conductor 131.

It will thus be seen that the ratchet solenoid, photo-electric cell amplifier, lamp, motor, and clamp solenoids are all connected across the line formed by the conductors 108 and 109.

By the conductors 116, 121, 126, 128, 123, and switch 104, the rectifier 129 is likewise connected across the same line. This rectifier has the function, known in the art, of giving the effect of a oneway current, and in the arrangement illustrated it is used to supply current to substantially all the recording apparatus.

Current through the rectifier, and consequently through the recording apparatus, is controlled by the "recorder switch" 104 and also by the switch 127, which in turn is controlled by the solenoid 132, this switch and solenoid forming the dashpot relay or other time-delay relay.

The various relay switches and magnet-operated switches indicated are supplied with the usual springs tending to keep them open or closed, as the case may be.

Connected to the amplifier 122 and receiving an amplified current therefrom is a circuit including the conductors 133 and 134 connected to opposite sides of the magnet 135 controlling witches 136 and 137, this magnet and the switches together being constructed so as to be a quick-acting relay.

The switch 136 is in a circuit leading from one side of the rectifier 129 through the conductors 138 and 139 to one side of the switch, the conductor 140 leading from the switch to the magnet 141 forming part of a rotary switch 142, and the conductors 143 and 144 leading to the other side of the rectifier 129.

The rotary switch 142 will hereinafter be referred to for convenience as rotary switch No. 1. This switch and other rotary switches hereinafter referred to may be of any well-known form, the details of which are not necessary to an understanding of the invention.

It is sufficient to say that the switch 142 comprises a rotary shaft 145 upon which are secured the three wiping contacts or brushes 146, 147, and 148. In the diagram of Fig. 20—B, these three contacts are shown on separate centers but are connected together by dotted lines, to show that the centers are preferably coincident in practice. The wiping contact 146 wipes over homing contacts 149, while the wiping contacts 147 and 148 wipe over selector contacts 150 and 151, respectively.

The circuit closed by engagement of the wiping contact 146 with one of the contacts 149 includes the switch 152 operated by the magnet 141, the contacts 146 and 149, the conductor 153, the normally-closed switch 154, conductors 155, 156, and 138, leading to one side of the rectifier, while the other side of the rectifier is connected through the conductors 144 and 143 and magnet 141 to the switch 152.

The circuits closed by engagement of the wiping contacts 147 and 148 with the contacts 150 and 151, respectively, will be described later, as these circuits include apparatus which has not yet been described.

There is shown a plurality of relays referred to, respectively, as slow release relay No. 1, slow release relay No. 2, slow release relay No. 2—A, slow release relay No. 3, and slow release relay No. 4. The circuits for these relays will now be described.

The magnet 157' operating the normally-open switch 157 of slow release No. 1, has current supplied to it on one side thereof by a conductor 158 leading through the switch 137 and the conductors 139 and 138 to one side of the rectifier 129, to the other side of which the magnet 156 is connected by means of conductors 144 and 143.

One side of the normally-open switch 157 is connected to one side of the rectifier 129 by means of the conductors 144, 143, and 159, while the other side of the switch 157 is connected to the other side of the rectifier by means of the conductor 160, magnet 161 of slow release relay No. 2, and conductors 162 and 138.

Slow release relay No. 2 comprises three switches, 163, 164, and 165. Of these three switches, 163 is normally closed and 164 is normally open, while 165 is normally in the position shown, closing one of two circuits, both of which will be more fully described later.

The magnet 166 of the slow release relay No. 2—A has current supplied to one side thereof from one side of the rectifier 129 through the conductors 144, 143, 167, switch 164, and conductor 168, whereas the other side of the magnet is connected to the other side of the rectifier by means of the conductors 138, 156, and 169. This relay controls a switch 170.

The magnet 171 of slow release relay No. 3 and which operates the switches 154 and 197, has one side thereof connected to one side of the rectifier 129 by means of the conductor 172, switch 170, conductors 173, 143, and 144, whereas the other side of the magnet 171 is connected to the same rectifier by the conductors 174, 156, and 138.

The magnet 175 of slow release relay No. 4 has one side thereof connected to one side of the rectifier 129 by means of the conductor 176, switch 165, conductors 177, 162, and 138, whereas the other side of the magnet 175 is connected to the other side of the same rectifier by the conductor 178, switch 179, contacts 181 and 182, and conductors 183, 143, and 144.

The switch 179 is controlled by the magnet 180 and forms therewith part of rotary switch No. 2, which is generally similar to rotary switch No. 1, having not only the wiping contact 181 adapted to engage the homing contacts 182, but also having the wiping contact 184 mounted upon the same shaft 185 as is the contact 181, and adapted to engage any one of the energizing contacts 186.

Similarly, the switch identified as rotary switch No. 3 has two wiping contacts 187 and 188 mounted upon a common shaft 189, contact 187 being adapted to engage any one of the homing contacts 190 and contact 188 being adapted to engage any one of the trip contacts 191.

The magnet 180 of rotary switch No. 2 receives its current from the rectifier 129 through the conductors 138, 162, 177, switch 165, and conductor 192 (or conductor 176 and switch 175') and conductor 193 leading to one side of the magnet, the other side being connected by the conductors 194, 183, 143, and 144 to the other side of the rectifier 129.

Current may be supplied from the rectifier 129 through conductors 144, 143, and 183 and contact 184 to any one of the electric contacts 186 and thence through one of the solenoids 92 and one of the contacts 150 and 147, or 151 and 148, as the case may be, to the conductor 195 and thence through the switch 163, conductor 196, switch 197, conductors 198, 156, and 138 back to the other side of the rectifier 129.

The magnet 199 of rotary switch No. 3 has one side thereof supplied with current from one side of the rectifier 129 through conductors 138, 156, and 201, whereas the other side of the magnet 199 is connected by the conductor 200 to the contact 186—M and thence through the contact 184, and conductors 183, 143, and 144 to the other side of the rectifier 129.

It should be noted that the solenoid 92—M is not connected to rotary switch No. 1, like the other solenoids 92, but is in a circuit comprising conductors 144, 143, 183, contacts 184 and 186—M, and conductors 202, 162, and 138.

Rotary switch No. 3, like the other rotary switches, has associated with its magnet 199 a switch 203 controlled by that magnet and permitting current to pass from one side of the switch through conductor 203', magnet 199, conductor 201, and conductors 156 and 138, to one side of the rectifier, whereas current from the other side of the switch 203 may pass through the contact 187, one of the homing contacts 190, the switch 105, and conductors 204, 143, and 144, to the other side of the rectifier 129.

Current from the line conductor 108 may pass through the conductor 205 to the conductor 188 and thence through one of the trip contacts 191, through one of the conductors 206 to one of the contacts 207 adapted to be engaged by the contact on the pointer 107 of the hand-operated switch 106 and thence through a conductor 208 and through the trip relay 111 to the other line conductor 109.

In operation, the thread is brought into position to be engaged by the two clamps 5 and 14 and is held by the feed clamp on the end of the arm 17 as in Fig. 1, being loosely engaged with the feed clamps on the arms 18 and 19 as previously described.

The pointer on the switch 106 which normally occupies the zero position shown in dotted lines in Fig. 20—B, is now set at the point desired. In the illustrated embodiment, I have assumed that it is desired to break the thread twenty-five times, and therefore I have set the pointer at 5 as indicated in Fig. 1 and in full lines in Fig. 20—B.

Normally, when idle the cam-operated switch 95 will be open and the switch 96 will be closed. However, as seen from Fig. 6, as soon as any substantial rotation of the cam shaft 35 takes place in the direction of the arrow appearing in that figure, the switch 95 will be closed so as to operate the solenoids 63 and cause the jaws of the clamps 5 and 14 to operate to grip the thread. At the same time, the switch 96 will be opened and remain open until near the end of the operation.

The cut-off switch 99 likewise will be open at the beginning of the operation so that the lamp 74 will not be lighted, but a relatively slight movement of the beam 100 of the scale will cause the switch 99 to close.

The breaker switch 103 may now be closed, thus completing the circuits through the motor 37, through the solenoids 63, and also through the lamp 74, except for the switches 95 and 99, which will be closed as soon as the motor has caused a small movement of the cam shaft 35.

The recorder switch 104 may be closed simultaneously with the switch 103, which will complete the circuit through the amplifier 122 to the photo-electric cell 73. Closing of this switch 104 will likewise energize the solenoid 132 of the dash-pot relay to close the switch 127 in the circuit of the rectifier 129, but the dash-pot will delay closing of the switch 127 for a sufficient time to permit the tubes of the amplifier 122 to become sufficiently warm to function, although the dash-pot relay may be omitted, if desired. As soon as the switch 127 does close, however, current will be available for the automatic operation of all of the apparatus and circuits described above.

With the closing of the switch 103, the motor 37 will start operation, and one of the first results will be the closing of the switch 95 by rotation of the cam shaft 35, to cause the solenoids 63 to operate the clamps 5 and 14 to grip the thread. The switch 96 will be opened by this same movement, as noted above. Another result of the rotation of the cam shaft 35 is to operate the cam 41 and depress the lever 13, thus causing the thread to break between the clamps 5 and 14. As previously described, this action will cause an actuation of the indicator and a consequent movement of the shutter 76 between the cell 73 and lamp 74.

The passage of each hole 77 in the shutter 76 will cause an impulse to be sent through the conductors 133 and 134 to the magnet 135 of the quick-acting relay of which that magnet forms a part, closing both of the switches 136 and 137. Closing of the switch 136 energizes the magnet 141 of rotary switch No. 1, and thereby causes the wiping contacts 146, 147, and 148 to move one step or into engagement with the next one of the contacts 149, 150, and 151, respectively, after which the switches 136 and 137 will be opened by the action of the relay. The operation of a rotary switch one step for each impulse is an action well known in the electrical art.

Since the holes 77 in the shutter are spaced apart a distance corresponding to units of weight, here taken as ounces, it will be seen that for each ounce of force applied and indicated on the scale, one hole will pass the light and thus one impulse will be given to the movement of the rotary switch.

The quick-acting relay is constructed with the usual spring, which will cause the switch 136 to open immediately after one hole has passed the light, it being understood that with the passage of a hole, the resistance of the cell will change enough to affect the amount of current passing through the relay sufficiently to permit the relay spring to act.

Normally, the switches 157, 164, 175', and 197 are open while the switches 163 and 154 are closed, and the switch 165 is in the position shown, connecting the conductors 176 and 177. In each instance, as noted above, the switch may be operated against the action of a spring tending to keep it in its normal position.

Closing of the switch 137 simultaneously with the switch 136 energizes slow release relay No. 1 to close switch 157, closing of which in turn will energize slow release relay No. 2 to close the switch 164, to open switch 163, and to operate the switch 165 to disconnect conductors 176 and 177 and to connect conductors 177 and 192. Closing of the switch 164 will energize the slow release relay No. 2—A, whereas the described operation of the switch 165 will deenergize slow release relay No. 4, thus closing switch 175' through its spring and operating rotary switch No. 2 by current now available through switch 165.

Energizing of the slow release relay No. 2—A will in turn energize slow release relay No. 3 which will open the switch 154 and thus break the circuit through the homing contacts 149 and wiping contact 146, in the circuit of which the switch 154 is located, as previously described.

The two rotary switches Nos. 1 and 2 will operate simultaneously under the action of the first impulse received, but the action of the slow release relay No. 4 holds the wipers 181 and 184 on the first contact 182 and 186, respectively, while the rotary switch continues to step the wiping contacts 146, 147, and 148.

These wiping contacts 146, 147, and 148 will continue to step around until the thread breaks and will move one step or one contact 149, 150, and 151, respectively, for each impulse received by the quick-acting relay. While this movement of the wiping contacts is taking place, all of the slow release relays No. 1, No. 2, No. 2—A, No. 3, and No. 4, will have remained energized because of their slow-release feature, and thus prevent further movement of the rotary switch No. 2.

For the sake of example, assume that ten impulses have been transmitted to rotary switch No. 1. Then it will be seen that the three wiping contacts 146, 147, and 148 have moved to their positions shown in dotted lines. In this connection, these wiping contacts are shown at zero positions in full lines, and it will be noted that in those positions each of the wiping contacts is in a dead or idle position. It will also be noted that when contact 146 engages with any one of the contacts 149 except the "zero" one, a circuit will be closed at that point.

It will also be noted that the wiping contact 184 is in engagement with a blank contact 186 as the result of the first impulse.

Rotary switch No. 1 acts as a selector switch to select and partially close a circuit through one or more of the solenoids 92. For example, with the number 10 to be recorded, as is assumed to be the case, then the selector switch has selected and partially closed circuits through the solenoids 92—1 and 92—0. The wiping contact 147 will have moved to the position shown in dotted lines, where it rests upon the tenth contact 150. Similarly, the wiping contact 148 has moved a corresponding amount and over a corresponding number of contacts 151, but these contacts are all dead or blank except the tenth one, which is connected to solenoid 92—0.

The nine contacts 150 following that marked 10 are all connected to the solenoid 92—1, so that for any figure between 10 and 20 this solenoid is selected by the wiping contact 147. At the same time it will be seen that the wiping contact 148, after passing the contact 151 indicated by the numeral 10, will select one of the solenoids 92—1a and 92—2, etc. Similarly, when the wiping contact 147 is engaging any one of the contacts 150 between the points marked 20 and 30, the wiping contact 148 will engage one of the contacts 151 between the points marked 20 and 30 so as to energize one of the solenoids 92—1a, 92—2a, 92—3, etc.

From the above it will be seen that for every number from 1 to 9, inclusive, it is possible to complete a circuit through one of the solenoids 92—1 to 92—9, inclusive, whereas for every number from 10 to 32, inclusive, two circuits may be completed through two different solenoids corresponding to the two digits in the number.

Rotary switch No. 2 may be termed the energizing switch, and completes the circuits through the solenoids selected by the selector switch, and which circuits have been partially completed by the selector switch. The complete circuit through one of the solenoids leads from one side of the rectifier 129 through the conductors 144, 143, 183, the contacts 184 and 186, the selected solenoid, one of the contacts 150 or 151 and thence to the wiping contact 147 or 148, as the case may be, to the conductor 195, switch 163, conductor 196, switch 197, conductors 198, 156, and 138. In the diagram, the principal part of this circuit is shown in heavy lines.

Now take the time when the wiping contacts 147 and 148 have come to rest so that the circuits through the various solenoids 92 have been selected, and the wiping contact 184 has moved one contact from the position indicated.

Slow release relay No. 1 will remain energized as long as impulses keep reaching it, but when those impulses cease, which occurs when the thread breaks, then this relay will cease to be energized and the switch 157 will open, thus in turn causing the deenergizing of slow release relay No. 2 and the vibrating reed relay.

Slow release relay No. 2, in dropping out, energizes slow release relay No. 4, causing the wiping contacts 181 and 184 to move in a clockwise direction around over the contacts 182 and 186, respectively, back to their normal position which is indicated in the diagram. In its movement, the wiping contact 184 will complete the circuits through the various solenoids 92 which have been selected by the selector switch. The movement of the wiping contact 184, however, is slowed up by slow release relay No. 4.

The switches operated by the magnets 175 and 180, respectively, will alternately energize and deenergize these two magnets so as thus to delay the action of rotary switch No. 2 or the energizing switch and thus insuring that the wiping contact 184 will have sufficiently long engagement with any of the contacts 186 which are in the selected circuits so that the solenoids 92 in those same circuits may be properly energized.

Slow release relay No. 2—A will maintain slow release relay No. 3 energized until the above described action has taken place, so as to maintain the switch 197 closed and the switch 154 open. When the switch 170 is closed, then the slow release relay No. 3 is deenergized and the switch 197 opens and the switch 154 closes.

Opening of the switch 197 breaks the circuit of the selector switch, and closing of the switch 154 puts current on the contacts 149 and completes the circuit through the magnet 141, thus causing the wiping contact 146 to rotate step by step in a clockwise direction until it reaches the position shown in full lines in the diagram, which movement is generally termed "going home". During this movement, of course, the wiping contacts 147 and 148 move with the wiping contact 146 until they too reach the full line positions indicated.

It will be noted that the numbered contacts 186, which are connected to the various solenoid circuits and therefore are "live", are spaced apart a substantial distance on the arc of contacts so as to insure that the contact 184 only closes one circuit at a time. It will also be seen that it is impossible for the wiping contact 184 to close two circuits to operate the same recording key.

For example, the recording key numbered 1 may be operated by either one of the two solenoids 92—1 or 92—1a, and it will be seen that the contacts 186 connected in the circuits of these two solenoids and numbered 1 and 1a respectively, are spaced apart widely on the arc of contacts 186. Thus if, for example, the recording key numbered 1 is to be actuated twice in succession to record the numeral 11, it will have time to operate once under the action of the solenoid 92—1 when energized by closing of its circuit of contacts 186—1, and then return to inoperative position before it is acted upon under the influence of the solenoid 92—1a, when energized by closing its circuit at contact 186—1a.

Now assuming that the thread has broken after a force of ten ounces has been applied to it. The breakage will not affect the operation of the motor which will continue to rotate the cam 41. The ratchet 68 will hold the pointer 66 in the position at which it was when the thread broke until released by the later action of the solenoid 70.

The wiping contact 184 will have moved over all of the contacts 186, as previously described, including the contacts 186—1 and 186—0, thus successively energizing the solenoids 92—1 and 92—0, to record the number 10 on the recorder.

The solenoid 92—M should be energized to print each recording, and for that purpose the circuit through that solenoid is closed by engagement of the wiping contact 184 with the contact 186—M, which is located so that the contact 184 may engage therewith only after having passed over all of the other live contacts. Energizing of the solenoid 92—M will cause one of the fingers 87 to operate the key 80, which will cause printing of the recorded figures upon the strip 83 and movement of the strip into position to present a blank space for printing of the next set of figures. This movement of the strip is effected by standard mechanism incorporated in the adding machine, as is well known.

The wiping contact 184, in passing over the contact 186—M, which is connected to the conductor 201, thus energizes rotary switch No. 3 momentarily and causes the wiping contacts 187 and 188 to move one step or one contact 190 and 191, respectively.

It will be seen that only every fifth contact 191 is connected to one of the conductors 206 so that every break of the thread causes the movement of the wiping contact 188 from one contact 191 to the next adjoining one, but engagement of the wiping contact 188 with the contact 191 acts as a switch to help in closing a circuit, only at every fifth or numbered contact 191. This is the reason why the pointer of the switch 106 is shown at a figure corresponding to the number of breaks desired, divided by five.

Movement of the wiping contact 187 over the homing contacts 190 will have no effect at this stage, but when the wiping contact 188 comes in contact with the contact 191—5, corresponding to the setting of the switch 106 in the selected example, a circuit will be completed through the conductor 205, contacts 188, 191—5, one of the conductors 206, the switch 106, conductor 208, and trip relay 111, which will open the switch 110 and stop the operation of the motor.

Before another set of tests takes place, the normally open reset switch 105 should be closed manually to close the circuit through the homing contacts and the magnet 199 and thus cause rotary switch No. 2 to return the contact 187 to initial position. This circuit comes from one side of the switch 203, through the contacts 187 and 190, switch 105, and conductors 204, 143, and 144, to one side of the rectifier, and from the other side of the switch 203, through conductor 203', magnet 199, and conductors 201, 156, and 138, to the other side of the rectifier.

After each break of the thread, until the motor is stopped, the cam shaft 35 continues its operation, causing successive breaks in successive lengths of thread fed into position to be broken. During the rotation of the cam shaft, the switches 95 and 96 are periodically opened and closed. Closing of the switch 96 takes place after the thread is broken, and will operate the ratchet solenoid and cause the ratchet 68 to release the pawl 67 to permit the pointer 66 to return to zero position before tension is placed upon another length of thread. This return is caused by the usual mechanism of the scale, which is of standard construction and need not be described or illustrated in detail.

When the operation of the motor is discontinued upon completion of the required number of test breaks, the key 80 may be actuated by the hand-operated stem 81 to totalize the figures.

The result of the above described operations is a printed or typed record on the strip 83, as shown in Fig. 14. The recorder selected for illustration is one in which the measurements themselves may be recorded in one column, as indicated, and in another column opposite each measurement is printed a numeral "1" to indicate one measurement. Operation of the totalizing mechanism of the recorder in the manner described above will result in providing two totals, one a total of the measurements and one a total of the number of measurements. In Fig. 14 the strip is a section of one in which the device was operated with the switch 106 set for ten breaks, and therefore ten measurements were recorded.

Referring now to Figs. 21, 22, 23, and 24, I have indicated therein a different embodiment of a certain part of the invention, more particularly the part relating to the sending of the impulses which actuate the recording mechanism.

I have found that for some types of testing apparatus where the units to be measured and recorded are relatively small, or where for any other reason the holes 77 in the shutter 76 are placed close together, and then a vibration occurs which will disturb the relation of the shutter to the lamp and cell, such vibration may cause the shutter to flutter enough to send impulses, by changing the quantity of light reaching the cell.

The structure and arrangement shown in Figs. 21, 22, 23, and 24 is designed to obviate this difficulty.

The parts appearing in Figs. 21, 22, 23, and 24 which are identical with the parts already described have been given the same numerals and a description of their function will not be repeated.

Instead of the shutter 76 having a hole 77 for each ounce or other unit of force, I provide it in this embodiment with one hole for each two ounces, thereby cutting down the number of holes by half. Cooperating with the shutter, I provide two lamps 74a and 74b, connected in parallel, and these lamps are so spaced apart lengthwise of the shutter that when one lamp is shining through one of the holes 77, the other lamp has its beam of light directed against an opaque part of the shutter between two of the holes. In this instance, the center to center spacing of the lamps is ¾ the center to center spacing of the holes.

Cooperating with each of the lamps is a photoelectric cell 73a, 73b, respectively. By means that will be explained later, when the scale pointer 66 indicates zero, neither lamp 74a nor 74b will be lighted, nor in registry with one of the holes, but the end hole 77—1 is disposed between the beam of light from the two lamps, as plainly shown in Figs. 22 and 24.

Now as the pointer 66 moves from zero to 1 on the scale face 67, the light in both lamps is lighted, by means to be described later, and the next to the last hole 77—2 will come into registry with the beam of light from the lamp 74b, as shown in Fig. 22—A, and cause this beam to act upon the cell 73b. However, the end hole 77—1 will not have reached a position to register with the beam of light from the lamp 74a, as shown in Fig. 22—A.

Then, as the pointer moves to 2 upon the scale face, the end hole 77—1 will be brought to a position to register with the beam of light from the lamp 74a and the next hole 77—2 will pass out of registry with the beam from the lamp 74b, all as shown in Fig. 22—B. This operation will be repeated, first one hole coming into registry with one beam of light and then the other hole coming into registry with the other beam of light, either one lamp or the other acting upon its cell for each unit of measurement.

Each cell is placed in the input circuit 124a—125a or 124b—125b of an amplifier 122a or 122b, respectively. These amplifiers are connected in parallel to the conductors 121 and 123, and they act in the same manner as the amplifier 122, which in the other embodiment is connected to the same conductors.

In the embodiment being described, instead of the switch 99 being used as shown in Fig. 5, I use a double switch indicated generally by the numeral 99' in Figs. 21, 23, and 24, and controlled by the position of the bracket 6. This switch comprises four spring contacts in what is known as a break-make assembly, these contacts being identified as 209, 210, 211, and 212. When the pointer 66 is at zero, the various contacts have the relation shown in Figs. 23 and 24, namely, the two contacts 209 and 210 are out of engagement with each other, and the contacts 211 and 212 are in engagement with each other, in which position they are held by the bracket, as shown.

Now as the bracket 6 is moved downwardly under the tension of the thread before it breaks, the contact 212 will move out of engagement with the contact 211, and the contact 209 is brought into engagement with the contact 210, the contacts 209 and 212 moving together under their spring actions and through the arrangement of insulating spacers 213, best shown in Fig. 23.

Therefore, as soon as tension on the thread is sufficient to move the bracket 6 downwardly, the result is to open one circuit and close another. The circuit controlled by the contacts 211—212 is a shorting circuit and includes a contact 215 centrally disposed on an armature 216 adapted to be operated by either one of the magnets 217 or 218 connected respectively in the output circuits of the amplifiers 122b and 122a.

This contact 215 is between and may contact with either one of two spring contacts 219 or 220, both connected to a conductor 221, which leads back to the contact 212. The conductor 214 is in turn connected through a battery 222 to the conductor 133, and the conductor 221 is connected directly to the conductor 134.

These conductors 133 and 134 are connected to opposite sides of the magnet 135 controlling switches 136' and 137'. These switches operate in much the same manner as the switches 136 and 137, except that in the present embodiment the magnet 135 is normally energized, whereas in the first described embodiment it is normally deenergized. The reason for this will be more fully described later.

Connected to the circuits of one of the cells, here shown as the cell 73a, are conductors 223 and 224 containing two high resistance units 225 and 226, and the circuit through these resistances comprises a switch 227 which is adapted to be closed by the shutter or pointer when at zero position, as indicated in Figs. 21 and 24.

Assuming that the pointer is at zero, then the circuit through the lamps is broken between the contacts 209 and 210, while the contacts 211 and 212, and 215 and 219, are in engagement, respectively. The various holes in the shutter occupy the positions shown in Figs. 22 and 24 and the magnets 217 and 218 are deenergized.

As soon as the pointer and shutter have moved a distance corresponding to one unit of measurement, then the next to the last hole 77—2 will come into registry with the lamp 74b as previously described, and as shown in Fig. 22—A, and will thus affect the cell 73b, energizing the magnet 217 and attracting the armature 216 to that magnet and away from the magnet 218. This will break the circuit between the contacts 215 and 219 and after a very short interval of time will make a circuit between the contacts 215 and 220. This action will momentarily deenergize the magnet 135 by breaking the circuit through the battery 222 and the magnet, thus permitting the switches 136' and 137' to close. When, however, the contact 215 engages the contact 220, the circuit is again completed through the magnet 135 and the battery 222, again opening the switches 136' and 137'. The result is the sending of an impulse to the magnet 135, which causes it to act in the same manner as described above in the first described embodiment, and then the immediate breaking of the circuit of that magnet, so that no further impulses may be sent no matter how much the shutter may vibrate.

The two magnets 217 and 218 are so constructed that the armature will stay in position against the core of the magnet last energized. Now assuming that the shutter and pointer move a distance corresponding to another unit of weight, the last hole 77—1 will come in registry with the lamp 74a and cell 73a, as shown in Fig. 22—B, and thus energize the magnet 218, which will cause an impulse to be sent to the magnet 135 in the same manner as just described above.

These operations will be repeated as each hole comes into registry with one of the lamps and its corresponding cell until the thread breaks, and the registry of a hole with a lamp results in only one impulse.

When the thread breaks, the bracket 6 will rise to the position shown in Figs. 23 and 24, opening the lamp circuit by moving the contact 209 out of engagement with the contact 210 and closing the shorting circuit by engagement of the contacts 211 and 212.

While the pointer and shutter are returning to zero, the lamps will thus be extinguished and no light will reach the cells from the lamps and thus no impulses will be sent. As the shutter and pointer reach zero, the switch 227 will be closed, short circuiting the input to the amplifier 122a, causing an impulse of current to flow through the magnet 218 in the same manner as if light reached the cell 73a, and thus causing the armature 216 to return to the position indicated, if not already there. If already there, the short circuiting has no effect.

The above operation is used in order to insure that the armature 216 shall always be at the indicated position when the pointer is at zero.

Assuming that the armature 216 is moved from engagement with the core of the magnet 217 to engage with the core of the magnet 218, or, in other words, to the position indicated, as just described, then that act would cause an impulse to be sent to the magnet 135 unless some means were provided to prevent it. Such means is provided by the shorting circuit comprising the conductor 214, contacts 211 and 212, and conductor 221, thus providing a short circuit between the conductors 214 and 221 and avoiding the sending of any impulse to the magnet 135 through the battery 222.

The general construction of the type of rotary switch shown herein is known in the art, as is also the necessary construction of relays to make them operate relatively slowly. It has not been thought necessary to describe any particular construction of slow-acting relay, nor for that matter of a vibrating reed relay, since that type of relay is also well known in the electrical art.

Furthermore, while I have shown the invention as employed in testing thread, and have used the word "thread" as defining the material being tested, it will be obvious that the specific apparatus could be equally well employed to test wire or rope or in fact any material capable of being fed in the manner illustrated.

In short, while I have shown the invention as embodied in specific forms, it is to be understood that various changes in details may be made without departing from the scope of the invention, as defined by the appended claims.

I claim:

1. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters, fingers adapted to operate said keys, solenoids adapted to operate said fingers, and means controlled by said impulses to energize said solenoids selectively.

2. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters, fingers adapted to operate said keys, solenoids adapted to operate said fingers, a circuit for each of said solenoids, means actuated by said impulses to select the solenoid circuits to be closed and to close the selected circuits to energize the solenoids therein.

3. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters and a key to control recording of the selected characters, fingers adapted to operate said keys, solenoids adapted to operate said fingers, a circuit for each of said solenoids, means actuated by said impulses to select the solenoid circuits to be closed and to close the selected circuits to energize the solenoids therein, and means to close the circuit of the solenoid controlling operation of the recording control key after the closing of the selecting control solenoid circuits.

4. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters and a key to control recording of the selected characters, fingers adapted to operate said keys, solenoids adapted to operate said fingers, a circuit for each of said solenoids, means actuated by said impulses to select the solenoid circuits to be closed and to close the selected circuits to energize the solenoids therein, means to close the circuit of the solenoid controlling operation of the recording control key after the closing of the selecting control solenoid circuits, and means to stop said actuation of the instrument after a predetermined number of measuring operations.

5. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters, fingers adapted to operate said keys, solenoids adapted to operate said fingers, a circuit for each of said solenoids, means actuated by said impulses to select the solenoid circuits to be closed and to close the selected circuits to energize the solenoids therein, one of said keys operating mechanism to print the measurement, means to close the circuit of the solenoid controlling operation of that key after the recording of each measurement, means to stop said actuation of the instrument after a predetermined number of measuring operations, and means to vary said predetermined number.

6. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters, fingers adapted to operate said keys, solenoids adapted to operate said fingers, a circuit for each of said solenoids, means actuated by said impulses to select the solenoid circuits to be closed and to close the selected circuits to energize the solenoids therein, and means introducing a lag between the time when the circuit is selected and the time when it is closed.

7. In combination, a measuring instrument comprising a shutter movable an amount in proportion to the amount of the measurement made by the instrument, said shutter having therein a plurality of holes spaced apart distances corresponding to predetermined units of measurement, a lamp on one side of said shutter and so placed as to have its light pass through said holes as the shutter moves, a light-sensitive cell on the opposite side of the shutter from the lamp and adapted to be affected by the light from the lamp as it passes through said holes, an electric circuit through which impulses are sent by said cell as thus affected by the light from the lamp, means to actuate said instrument a plurality of times in succession to perform a series of measuring operations, each of said operations actuating said shutter to send impulses through said circuit, a recorder having a plurality of operating keys to select characters, fingers adapted to operate said keys, magnets adapted to operate said fingers, a circuit for each of said magnets, a selector switch movable to select the circuits of the magnets to be closed, an energizing switch adapted to close said circuits, and means actuated by said impulses first to operate said selector switch and then to operate said energizing switch.

8. In a recording mechanism, a plurality of circuits, a plurality of switches disposed in parallel and adapted to close any of said circuits, each switch comprising a plurality of stationary contacts, each contact disposed in one of said circuits, and also comprising a movable contact adapted to engage any one of said stationary contacts to close a circuit at that point, said stationary contacts being arranged in groups of ten, consecutively numbered, and said movable contacts moving together, with one movable contact engaging and passing over one of said groups of contacts before the other movable contact engages any contact of another group.

9. In a recording mechanism, a plurality of circuits, a plurality of switches disposed in parallel and adapted to close any of said circuits, each switch comprising a plurality of stationary contacts, each contact disposed in one of said circuits, and also comprising a movable contact adapted to engage any one of said stationary contacts to close a circuit at that point, said stationary contacts being arranged in groups of ten, consecutively numbered, said movable contacts moving together, with one movable contact engaging and passing over one of said groups of contacts before the other movable contact engages any contact of another group, and said first-named movable contact maintaining its electrical engagement with the last contact in said one group while the said second-named movable contact is in engagement with any one of the contacts in said other group.

THOMAS J. NUNAN.

CERTIFICATE OF CORRECTION.

Patent No. 2,142,252.  January 3, 1939.

THOMAS J. NUNAN.

It is hereby certified that error appears in the printed specification of the above numbered patent requiring correction as follows: Page 11, first column, line 48, claim 5, after the word and comma "characters," insert and a key to control recording of the selected characters; lines 53 to 57 inclusive, same claim, strike out "one of said keys operating mechanism to print the measurement, means to close the circuit of the solenoid controlling operation of that key after the recording of each measurement" and insert instead the words means to close the circuit of the solenoid controlling operation of the recording control key after the closing of the selecting control solenoid circuits; and that the said Letters Patent should be read with this correction therein that the same may conform to the record of the case in the Patent Office.

Signed and sealed this 14th day of February, A.D. 1939.

Henry Van Arsdale.

(Seal)  Acting Commissioner of Patents.